United States Patent
Gibson et al.

(10) Patent No.: US 10,029,695 B1
(45) Date of Patent: Jul. 24, 2018

(54) METHODS AND SYSTEMS FOR A BELT-DRIVEN INTEGRATED STARTER GENERATOR

(71) Applicant: Ford Global Technologies, LLC, Dearborn, MI (US)

(72) Inventors: Alexander O'Connor Gibson, Ann Arbor, MI (US); John Eric Rollinger, Troy, MI (US); David Lew, Canton, MI (US); David Spuller, Dexter, MI (US); Veronica Pablo Osorio, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/449,849

(22) Filed: Mar. 3, 2017

(51) Int. Cl.
| | |
|---|---|
| *B60W 30/19* | (2012.01) |
| *B60W 10/06* | (2006.01) |
| *B60W 30/192* | (2012.01) |
| *B60W 10/30* | (2006.01) |
| *F16H 7/08* | (2006.01) |

(52) U.S. Cl.
CPC .......... *B60W 30/192* (2013.01); *B60W 10/06* (2013.01); *B60W 10/30* (2013.01); *B60W 2510/0628* (2013.01); *B60W 2510/0657* (2013.01); *B60W 2510/0671* (2013.01); *B60W 2510/101* (2013.01); *B60W 2510/244* (2013.01); *B60W 2510/30* (2013.01); *B60W 2540/06* (2013.01); *B60W 2540/10* (2013.01); *B60W 2710/30* (2013.01); *F16H 2007/0812* (2013.01); *F16H 2007/0823* (2013.01); *F16H 2007/0885* (2013.01); *F16H 2007/0887* (2013.01)

(58) Field of Classification Search
CPC .... B60W 30/19; B60W 30/192; B60W 10/06; B60W 10/30; B60W 2510/0657; B60W 2510/0671; B60W 2510/101; B60W 2510/30; B60W 2510/244
See application file for complete search history.

(56) References Cited

U.S. PATENT DOCUMENTS

| | | | | |
|---|---|---|---|---|
| 6,609,989 | B2 * | 8/2003 | Bogner | .............. F02B 63/04 474/134 |
| 7,004,865 | B2 * | 2/2006 | Berndt | .............. F16H 7/129 474/109 |
| 8,568,259 | B2 * | 10/2013 | Robbins | .............. F16H 7/1281 474/135 |
| 2008/0021603 | A1 | 1/2008 | Zettel et al. | |
| 2009/0195203 | A1 | 8/2009 | Yurgil | |
| 2009/0198403 | A1 | 8/2009 | Yurgil et al. | |
| 2010/0326747 | A1 | 12/2010 | Ratliff et al. | |
| 2016/0065107 | A1 * | 3/2016 | Klein | .............. F01B 27/02 290/31 |

\* cited by examiner

*Primary Examiner* — Hieu T Vo
(74) *Attorney, Agent, or Firm* — Julia Voutyras; McCoy Russell LLP (57) ABSTRACT

Methods and systems are provided for identifying degradation of a belt-driven integrated starter generator (BISG) active belt tensioner coupled to a vehicle engine. By using the monitored change in FEAD load to compare the actual state of the tensioner (either in retracted or extended state) relative to the commanded state, the presence of excess belt tension may be distinguished from the presence of insufficient belt tension. Timely diagnosis of a belt tensioner may be improve belt health and extend fuel economy benefits of a BISG system.

20 Claims, 7 Drawing Sheets

METHODS AND SYSTEMS FOR A BELT-DRIVEN INTEGRATED STARTER GENERATOR

FIELD

The present description relates to methods and systems for an active belt tensioner of a belt-driven integrated starter generator (BISG) coupled to a vehicle engine.

BACKGROUND AND SUMMARY

Vehicles may be configured with a starter motor for spinning an engine from rest. In some vehicle systems, the starter motor may be included in a belt-driven integrated starter generator (BISG) where an electric motor/generator (acting in the motoring mode) provides torque to crank the engine via a belt drive during engine restart conditions. During other conditions, the motor/generator may be operated in the generating mode to charge a system battery using excess engine torque. In doing so, the BISG enables stop/start functions to be provided. The BISG may also be used in place of an alternator to maintain accessory load functions when the engine is shut down and the vehicle is stopped. Further, the BISG may be used to provide a hybrid power assist to the engine torque by adding motor torque drawn from the battery. In this way, use of a BISG can improve vehicle performance and fuel economy.

BISG systems may include one or more tensioners for maintaining tension in the belt drive coupling the BISG to an engine crankshaft and one or more accessories such as an air conditioning system. Belt tension may be maintained by way of passive tensioners including, for example, various pulleys and biased springs with integral dampers. Alternatively, belt tension may be provided by way of actively controlled tensioner devices, such as electric, hydraulic, or electro-hydraulic devices, to selectively increase belt tension only when high torque demands are made. Belt tensioners may be periodically diagnosed so as to enable belt drive tension to be maintained, thereby reducing friction losses.

One example approach for diagnosing the functionality of a tensioner is shown by Zettel et al. in US20080021603. Therein, a belt drive couples the motor generator to each of an engine and an accessory, and a degraded state of the belt drive is inferred based on a comparison of engine speed relative to accessory speed. In particular, if an expected accessory speed, determined based on the measured engine speed differs, from the actual accessory speed, it may be determined that there is belt slippage.

However, the inventors herein have identified potential issues with such an approach. As one example, by the time belt slippage is detected by the method of Zettel, there may already be excessive slip, requiring a costly replacement of the belt. As another example, the approach of Zettel is not able to identify the cause of belt slippage. Belt slippage may be caused due to insufficient tension in the belt, which may degrade engine crank and torque boost events. Alternatively, belt slippage may be caused due to elevated tension in the belt under all conditions, which can cause increased engine and belt wear. If the cause of belt slippage is not clearly determined, it may be difficult to mitigate future belt slip events. In the case of belt tensioners coupled to a BISG, distinction of a cause of the belt slippage based on engine speed or accessory speed may be further complicated by the ability of the BISG to increase tension by adding positive torque or negative torque to the belt drive during a torque transient, e.g. a sudden increase or decrease in BISG torque.

The inventors herein have recognized the above-mentioned issues and have developed an engine operating method to identify degradation of an active belt tensioner. One example method for an engine comprises: adjusting an operating state of a belt tensioner coupled to a drive belt; adjusting an operating state of a belt tensioner coupled to a drive belt; and indicating tensioner degradation in response to engine load being less than a threshold after the adjusting. In this way, a cause of belt slippage may be reliably identified before excessive slip occurs, allowing for mitigating actions to be timely performed.

As an example, a hybrid vehicle system may include an engine coupled to a BISG and an accessory via a front end accessory belt drive (FEAD). The belt drive may further include an active tensioner coupled between the engine crankshaft and the BISG. The active tensioner may be an electro-hydraulic active tensioner configured to operate at a lower tension when the BISG torque is below a threshold and at a higher tension when positive or negative torque provided by the BISG is below a different threshold. In particular, during an engine start, an electric solenoid may be energized to actuate the tensioner to an extended state where the tensioner applies a higher tension to the belt drive. The higher tension enables positive torque to be transferred from the BISG, operating as a motor, to crank the engine. During an engine start/stop event, the electric solenoid may again be energized to actuate the tensioner to the extended state. The higher tension may enable negative torque to be transferred from the BISG, operating as a generator, to stop the engine, while damping the engine torque pulsations. During all other engine operating conditions, the electric solenoid may be de-energized to actuate the tensioner to a retracted state where the tensioner applies a lower tension to the belt drive. During selected conditions, such as when the engine is in a steady-state and the BISG torque is at or around zero torque, the tensioner may be actively actuated to the extended state and one or more engine torque parameters indicative of an increase in engine load may be monitored over a duration. For example, one or more of an intake air flow, an intake manifold air pressure, a rate of engine fuel consumption, and an engine torque output may be monitored. If the monitored parameters are within an expected range, the measured increase in engine load is attributed to the tensioner extending and applying an increased tension to the belt drive, as intended. If the monitored parameters are below the expected range, then it may be inferred that the lack of increase in engine load is due to the tensioner not extending (e.g., the tensioner was stuck in the retracted state) and that belt slip may occur due to insufficient belt tension. Optionally, the tensioner may be similarly actuated to the retracted state, and it may be inferred that the tensioner did not retract (e.g., tensioner was stuck in the extended state) if the monitored parameters are above the expected range, and further that belt slip may occur due to excessive belt tension. Accordingly, distinct mitigating actions may be performed. For example, in response to the tensioner being stuck in the retracted state, power assist provided by the BISG and start/stop operations may be limited. As another example, in response to the tensioner being stuck in the extended state, boosted engine torque may be limited to prevent damage to the FEAD belt and engine journal bearings.

In this way, an active tensioner of a BISG may be accurately and reliably diagnosed, enabling belt slip to be better predicted. The technical effect of actuating the active tensioner to a selected state and monitoring a change in FEAD load following the actuation is that the actual operating state of the tensioner may be better identified. By using the monitored change in FEAD load to compare the actual state of the tensioner relative to the commanded state, the presence of excess belt tension may be distinguished from the presence of insufficient belt tension. Consequently, incidence of belt slip and the likely cause of belt slip may be identified in a timely manner, before excessive slip occurs. By timely diagnosing a belt tensioner, belt health may be improved, enabling the fuel economy benefits of a BISG system to be extended.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
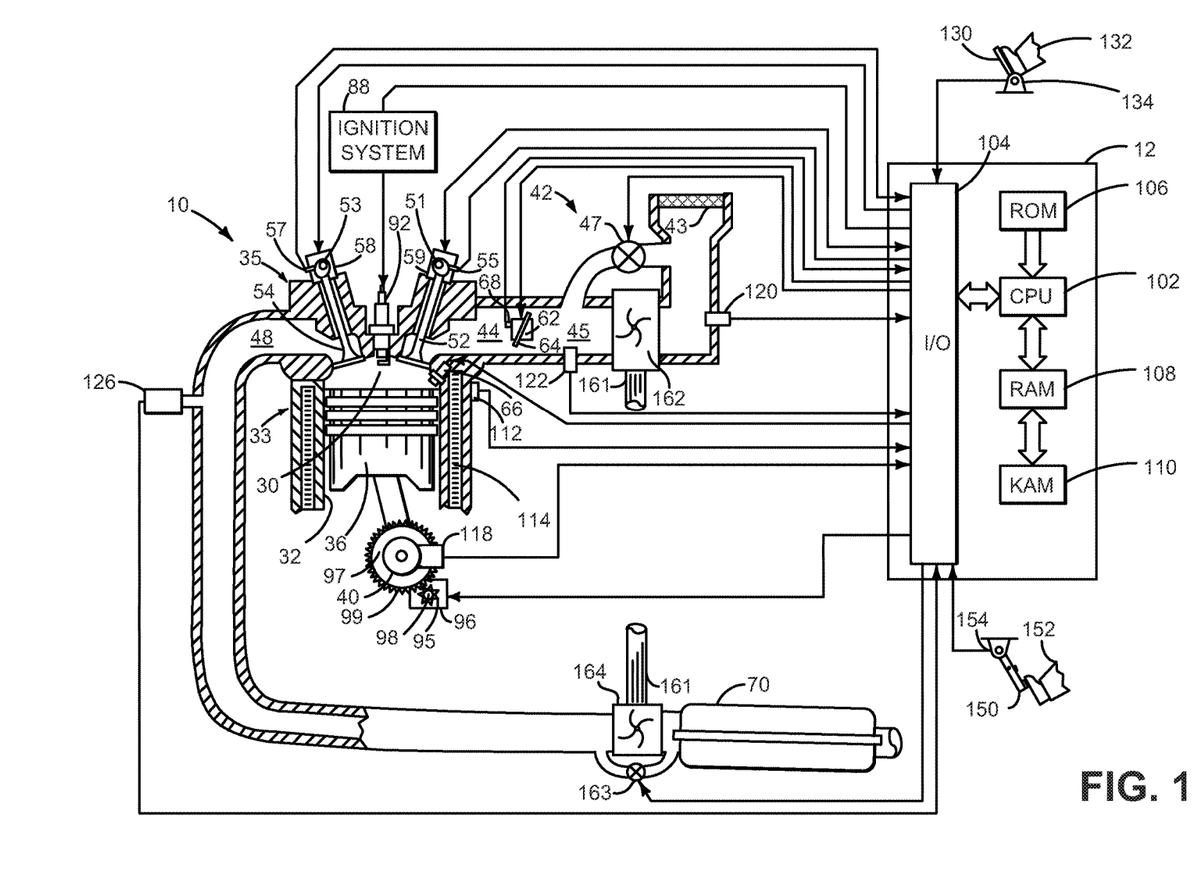
FIG. 1 is a schematic diagram of an engine system coupled in a hybrid vehicle system.
Figure 2:
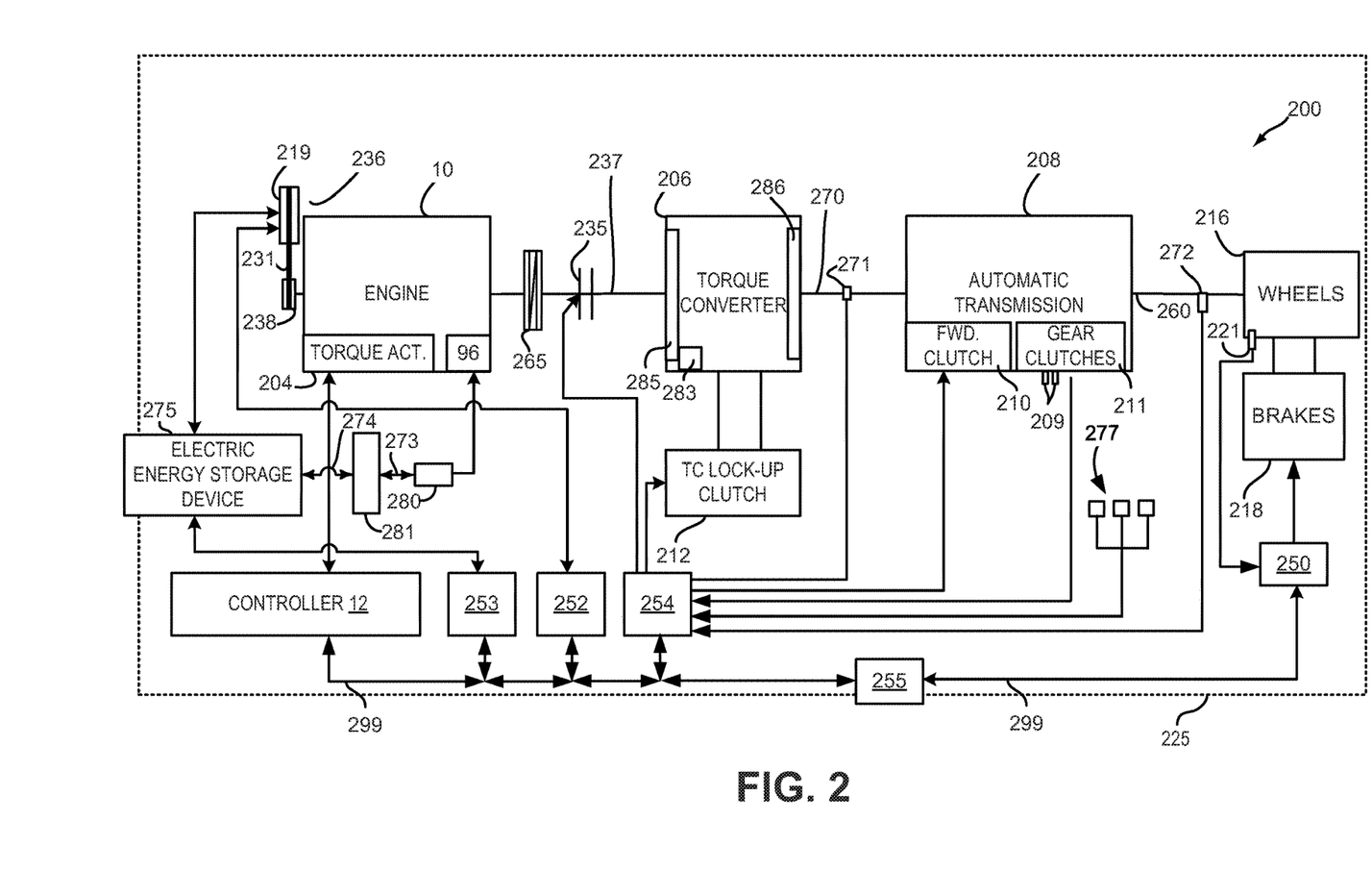
FIG. 2 is a schematic diagram of a front end accessory drive structure coupled to an engine system of a hybrid vehicle system.
Figure 3:
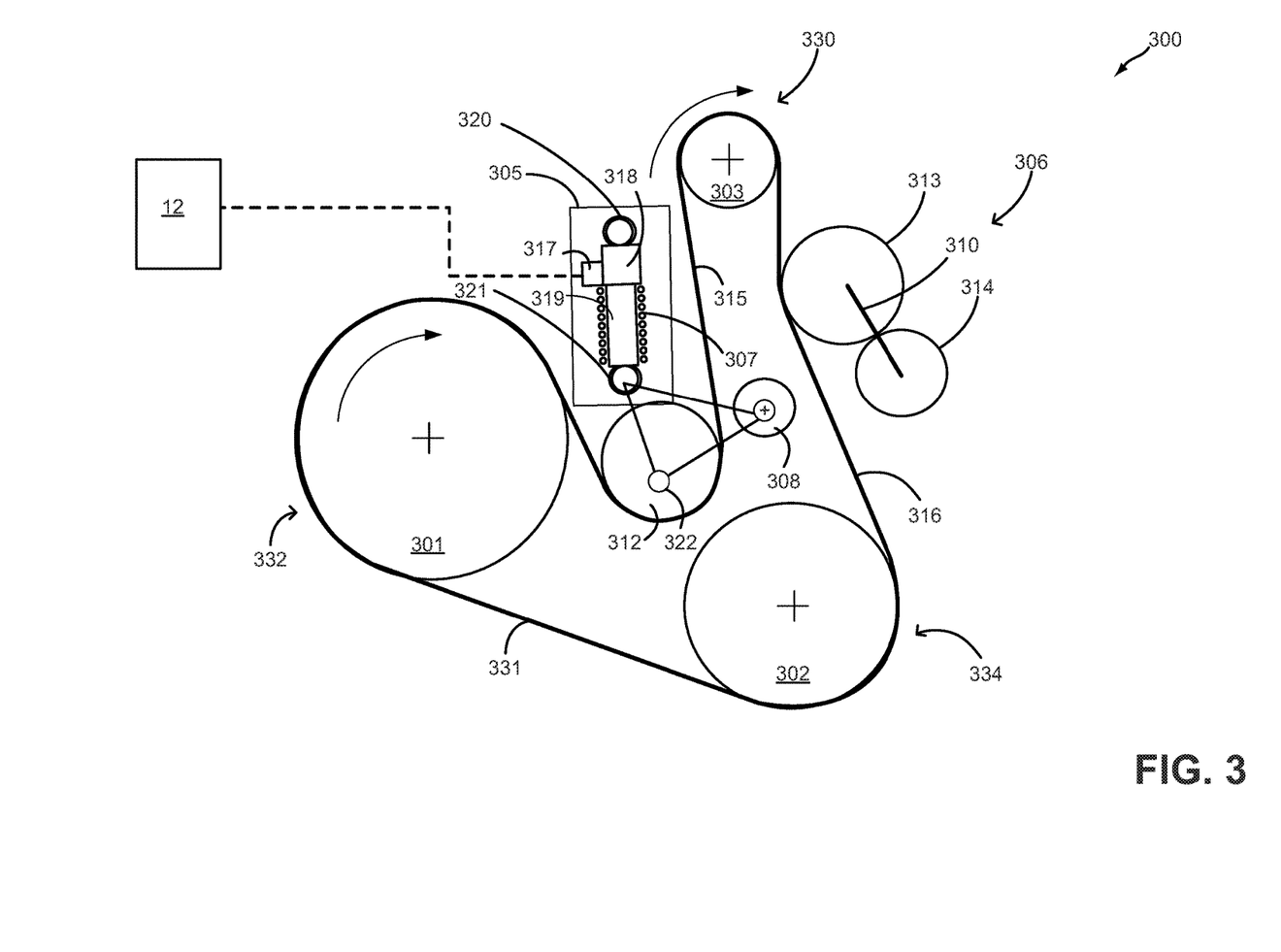
FIG. 3 shows an example schematic representation of a BISG FEAD system.

The present description relates to an engine driveline including a belt integrated starter generator (BISG) system. An example internal combustion engine coupled in a hybrid vehicle system is shown at FIG. 1. A driveline of the engine including the BISG system is shown at FIG. 2. The BISG system may be coupled via a belt to a front end accessory drive (FEAD) including an engine crankshaft and an accessory load, as shown at FIG. 3. One or more tensioners, such as the active tensioner of FIG. 4, may be used to vary the tension applied on the belt drive. A controller may be configured to perform a control routine, such as the example routine of FIG. 5, to energize a solenoid of the active tensioner during selected conditions, such as during engine cranking, to increase the tension applied on the belt drive, thereby increasing engine load. The controller may also be configured to perform a diagnostic routine, such as the example routine of FIG. 6, to diagnose the active tensioner based on a change in engine load, as measured via one or more parameters indicative of engine load, following energizing of the solenoid. Example adjustments to the energization state of the tensioner solenoid and example changes in engine load are depicted with reference to the prophetic example of FIG. 7. In this way, by reliably diagnosing BISG tensioner health, engine start/stop performance can be improved.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10. Engine 10 may be started with an engine starting system including belt integrated starter generator (BISG) 219. As elaborated with reference to FIG. 3, BISG 219 may be coupled via a belt to a front end accessory drive (FEAD) 236 including the engine crankshaft 238 and an accessory load (such as an air conditioning system, not shown). Further, torque of engine 10 may be adjusted via torque actuator 204, such as a fuel injector, throttle, etc. BISG is mechanically coupled to engine 10 via belt 231. BISG may be coupled to crankshaft 40 or a camshaft (e.g., 51 or 53). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vise-versa. Low voltage battery 280 is electrically coupled to low voltage buss 273. Electric energy storage device 275 is electrically coupled to high voltage buss 274. Low voltage battery 280 selectively supplies electrical energy to starter motor 96.

Engine output torque is transmitted along the driveline to vehicle wheels 216 for propulsion of vehicle 225. Specifically, engine output torque is transmitted, along input shaft 237, to torque converter 206 where torque amplification can occur. Engine 10 is coupled to the torque converter powertrain disconnect clutch 235. A damper 265 may be included between the engine 10 and the disconnect clutch 235 to reduce NVH caused by engine torque pulsations. Disconnect clutch 235 may be electrically or hydraulically actuated.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 235, forward clutch 210, and gear clutches 211. Pump 283 is driven via impeller 285.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the BISG. Vehicle system controller 255 requests the engine torque from engine controller 12 and the BISG torque from electric machine controller 252. If the BISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative BISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the BISG 219 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. BISG 219 supplies a negative torque to transmission input shaft 270, but negative torque provided by BISG 219 may be limited by transmission controller 254 which outputs a transmission input shaft negative torque limit (e.g., not to be exceeded threshold value). Further, negative torque of BISG 219 may be limited (e.g., constrained to less than a threshold negative threshold torque) based on operating conditions of electric energy storage device 275, by vehicle system controller 255, or electric machine controller 252. Any portion of desired negative wheel torque that may not be provided by BISG 219 because of transmission or BISG limits may be allocated to friction brakes 218 so that the desired wheel torque is provided by a combination of negative wheel torque from friction brakes 218 and BISG 219.

Accordingly, torque control of the various powertrain components may be supervised by vehicle system controller 255 with local torque control for the engine 10, transmission 208, BISG 219, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from BISG 219 by adjusting current flowing to and from field and/or armature windings of BISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative BISG torque does not cause the wheel torque limit to be exceeded. For example, if controller 250 issues a negative wheel torque limit of 50 N-m, BISG torque is adjusted to provide less than 50 N-m (e.g., 49 N-m) of negative torque at the wheels, including accounting for transmission gearing.

Thus, the system of FIGS. 1 and 2 provides for a system, comprising: an engine; a transmission coupled to the engine; a motor/generator coupled to the engine via a belt; a disconnect clutch positioned in a driveline between the engine and the torque converter; an electric energy storage device electrically coupled to the BISG motor/generator; and a vehicle system controller including executable instructions stored in non-transitory memory to ROM.

FIG. 3 is an example schematic representation of a BISG system 300. In one example, the BISG system includes BISG 219 coupled to FEAD 236 of FIG. 2. BISG system 300 may be included as a belt transmission device for an engine of a hybrid vehicle system.

BISG system 300 includes a single FEAD drive belt 331 that is frictionally coupled to each of a BISG pulley 303 of BISG 330, as well as to a crankshaft pulley 301 of engine crankshaft 332. Belt 331 is also frictionally coupled to pulley for an accessory load of the engine, herein depicted as AC clutch pulley 302 of an air conditioning (AC) system 334.

Drive belt 331 may be a polyester fiber based belt. In some examples, the belt material may be upgraded to a Kevlar fiber based belt. Unlike an alternator, BISG 330 is capable of producing both a positive and a negative torque. Further, the BISG acts as a higher power generator (e.g., 4 kW or 2 kW) and is capable of producing significant positive torque. As a result, the FEAD belt tension is increased when an alternator is replaced by a BISG. The increase in the FEAD belt tension my lead to an increase in the crankshaft pulley 301 side load on the crankshaft journal bearings. This may require an upgrade to the crankshaft journal bearings to handle the increased load as well as an upgrade in the belt material (e.g., to a Kevlar fiber).

The drive belt 331 includes one or more tensioners for varying a belt tension as loads and torques applies on the belt drive vary. Based on whether the belt is being driven or is driving, and further based on the pulley (crankshaft pulley or BISG pulley) that is driving the torque, tension in the belt may vary, resulting in a slack side and a tight side. For example, consider a first span 315 of drive belt 331 (between crankshaft pulley 301 and BISG pulley 303), relative to a second span 316 of drive belt 331 (between BISG pulley 303 and AC clutch pulley 302). When torque is transmitted from BISG pulley 303 to rotate crankshaft pulley 301, such as when the BISG is in a motoring mode, the second span 316 has less (based upon rotational direction shown in FIG. 3) tension than the first span 315. During such conditions, the one or more tensioners may be used to apply tension on the first span 315, or reduce tension on the second span 316. In comparison, when torque is transmitted from crankshaft pulley 301 to rotate BISG pulley 303, such as when the BISG is in a generating mode, the first span 315 has less (based upon rotational direction shown in FIG. 3) tension than the second span 316. During such conditions, the one or more tensioners may be used to apply tension on the second span 316 or reduce tension on the first span 315.

As one example, the drive belt 331 may include a passive tensioner 306. As such, passive tensioners are configured to pick up slack in all segments of the drive belts, while other tensioning elements including idler pulleys, wheels, or active tensioners take up slack at selected operational times in other segments of the drive belt. Passive tensioners include a spring with an integral damper. Passive tensioner 306 comprises a linear spring (or damper) 310 coupled to a riding pulley 313 for riding on drive belt 331 and an idler pulley 314. The passive tensioner may be mounted onto an engine component via the idler pulley 314 to take up slack in the second span 316 of the FEAD belt while BISG is in positive or negative torque. In other examples, a rotary spring damper may be used. The passive tensioner 306 is coupled to the drive belt 331 between the A/C clutch pulley 302 and the BISG pulley 303. Spring 310 applies an adjusting force that biases the spring 310 in the direction in which riding pulley 313 is pressed or rotated against belt 331, thereby absorbing any change in the tension of the second span 316 of the drive belt.

The drive belt 331 further includes an active tensioner 305. Thus the depicted embodiment includes multiple tensioning devices unlike conventional FEAD systems that include an alternator and have a single tensioner on a slack side of the alternator. It will be appreciated that in alternate embodiments, the drive belt may include a single bi-directional tensioning device. In the depicted example, the active tensioner is electrically driven though it will be appreciated that in alternate embodiments, the tensioner may be hydraulically or pneumatically driven. Active tensioner 305 may be able to maintain, or control to, a lower tension when the BISG torque is below a threshold by actuating the device prior to the increase in torque and by allowing engine combustions pulsations to cause the active tensioner to extend prior to the commanded torque increase. In one example, during idle and prior to engine shut-down, the actuator may be extended in order to increase the belt tension and thus, the tensioner is maintained at its extended state during engine shutdown. As such, upon engine restart, the belt tension may be maintained or reduced depending on the BISG torque state. For example, the belt tension may be reduced by deactivating the tensioner when BISG is in a low torque state. In another example, the belt tension may be maintained by actuating the tensioner when BISG is operating under high torque state. Alternatively, the active tensioner 305 may also operate at a higher tension when the BISG positive or negative torque is below one or more thresholds. That is, the positive and negative torque thresholds may be different and a function of engine operating point including engine speed, load, and FEAD thermal conditions. Further, the level of belt tension may be a function of the desired maximum BISG torque in either positive or negative torque modes. Further still, the belt tension may also depends on other factors, such as the belt/pulley thermal state may limit the maximum torque that the belt can transmit.

Active tensioner 305 is configured to vary the tension in the first span 315 of drive belt 331, between the engine crankshaft pulley 301 and the BISG pulley 303. Active tensioners are able to actively or automatically engage the drive belt 331. Active tensioner 305 includes an idler pulley 312, a biasing mechanism depicted herein as a spring 307, a piston coupled to lower chamber 319, and an electric solenoid 317. The electric solenoid 317 is coupled to engine controller 12 and can be energized or de-energized responsive to a control signal received from controller 12. Spring 307 is coupled to idler pulley 312 via mounting structure 321 and coupled to an engine component (such as a transmission, exhaust manifold, etc.) via upper mounting structure 320. Responsive to energization of solenoid 317, oil may be moved from an upper chamber 318 into lower chamber 319, thereby locking a position of the piston of the active tensioner, as elaborated at FIG. 4. Component 308 is used to limit side-to-side motion of the idler pulley 312 and pulley axis 322. In addition, the triangular structure holds component 308, idler pulley 312, and lower mounting structure 321 together and is used to constrain the motion of the idler pulley 312 and pulley axis 322.

In the depicted example, the active tensioner 305 is an electro-hydraulic tensioner that is operated via the actuation of electric solenoid 317. When the solenoid is not energized, active tensioner 305 behaves like a passive linear hydraulic damper that allows hydraulic fluid to move from one side of a piston in lower chamber 319 to the other side as a function of a pressure difference across the piston.

Thus, during an engine start, when a starting torque is imparted to belt 331 by BISG pulley 303, due to the motoring of BISG 330, the starting torque imparted to rotate crankshaft pulley 301, second span 316 has less tension (based upon rotational direction shown in FIG. 3) than the first span 315. To increase tension on the slack side (first span 315), solenoid 317 of active tensioner 305 is energized to extend spring 307 with the result that idler pulley 312 is extended into operative engagement with the first span 315 of the drive belt 331. After the engine has been started, such as when torque transmitted via crankshaft pulley 301 results in the engine speed exceeding a threshold (e.g., 400 rpm), the engine-cranking torque is removed from belt 331 by disabling BISG 330. At that time, solenoid 317 is de-energized such that spring 307 retracts, causing idler pulley 312 to be retracted out of operative engagement with first span 315, reducing tension on that span of the belt.

During conditions when excess torque is generated by the engine and the excess torque is used to operate the BISG 330 as a motor (to charge a battery), a motoring torque is transferred to belt 331 by crankshaft pulley 301 to rotate BISG pulley 303. Due to the motoring of BISG 330 via the engine, first span 315 has more tension than the second span 316. Tension is automatically increased on the slack side (second span 316) by passive tensioner 306. In particular, spring 310 biases idler pulley 313 into operative engagement with second span 316 of belt 331. In addition, solenoid 317 of active tensioner 305 is de-energized to retract spring 307 with the result that idler pulley 312 is retracted from operative engagement with the first span 315 of the drive belt 331.

The selective extension and retraction of the active tensioner increases the service life of belt 331 since the life of the belt is inversely proportional to its maximum tension.

Figure 4:
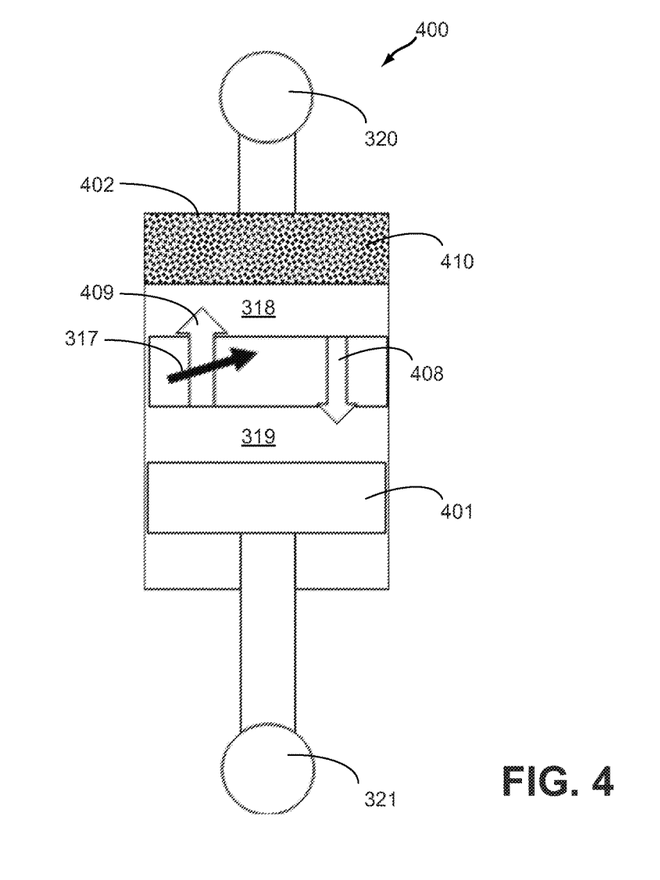
FIG. 4 is an example schematic representation of an active FEAD BISG tensioner in energized and de-energized states.

Turning to FIG. 4, the operation of an example active BISG FEAD tensioner is shown. FIG. 4 depicts an embodiment of an active tensioner 400 with one way flow ports in a fixed position. Components previously introduced in FIG. 3 are numbered similarly and not reintroduced.

The active tensioner 400 may be an electro-hydraulic active tensioner driven by electric solenoid 317 (represented as a black arrow). Electric solenoid 317 is energized or de-energized responsive to a signal from an engine controller. Tensioner 400 includes a housing 402 configured to receive a hydraulic fluid, such as oil. A space inside the housing 402 is divided into a lower chamber 319, within which a piston 401 can move, and an upper chamber 318. Piston motion is affected based on oil pressure across the piston. As such, when the pressure in the upper chamber 318 is higher than lower chamber 319, oil will flow from upper chamber 318 to lower chamber 319. A gas pressurized strut 410 is placed within the top chamber 318 to minimize cavitation. The actuation of the piston actuates a biasing member of the tensioner, such as a coil spring (not shown). The coil spring is usually disposed on an outer surface of housing 402 and extends along the length of upper and lower chambers. Oil may move from the upper chamber 318 to the lower chamber 319 via a first flow orifice 408 and from the lower chamber to the upper chamber via a second flow orifice 409. The flow orifice 408 and 409 are both equipped with a one-way check valve, which only allows the fluid to move in one direction, i.e. from upper to lower chamber for the first orifice 408 and from lower to upper chamber for the second orifice 409. Further, the second flow orifice 409 is also equipped with a solenoid, which is able to block the flow path when energized. Upon actuation by solenoid 317, oil can no longer travel from lower to upper chamber, preventing retraction, and only allowing tensioner extension.

When the engine is being cranked via the BISG (e.g. at engine speeds from 0 rpm to approximately 400 rpm), belt tension may need to be increased in a region of the belt between a crankshaft pulley and a BISG pulley. To increase tension in that region of the belt, electric solenoid 317 may be energized to block the movement of the oil in the lower chamber 319 to flow along the second flow orifice 409 and into upper chamber 318. This higher tension enables positive torque to be transferred from the BISG, operating as a motor, to crank the engine. In one example, during engine rotation, combustion pulsations may cause vibration in the FEAD belt, which creates a pulsation on the force applied at mounting structure 321 and pulley axis 322. This pulsating force causes an increase in the pressure of the active tensioner. If the tensioner is in the non-active state, then lower mounting structure 321 may oscillates up and down relative to upper mounting structure 320. However, if the actuator is in the active state, fluid motion becomes limited and thus, prevent compression. As such, lower mounting structure 321 will then move away from upper mounting structure 320, i.e. extends. The flow of the fluid through the valves from the upper chamber 318 to the lower chamber 319 depends on the location of the check valves relative to the piston, i.e. whether the valves are located within or above the piston.

After the engine speed reaches a threshold speed and the BISG is not needed to crank the engine, the electric solenoid may be de-energized and the control valve returns to its default position, which allows the oil to flow along the first flow orifice 408 and the second flow orifice 409. Piston 401 is retracted and the BISG pulley moves away from the belt, thereby decreasing the tension on the belt drive.

Thus, when the electric solenoid is not energized, the tensioner behaves like a passive linear hydraulic damper allowing the hydraulic fluid to move from one side of the piston to the other as a function of the pressure difference across the piston. Unlike a typical damper that has a single orifice to which allows the fluid to flow across the piston as a function of the pressure difference across the piston, active tensioner 400 uses two separate flow paths. Second fluid pathway 409 can be blocked when the electric solenoid actuates and the other pathway 408 uses a ball check valve to only allow flow from the upper side of the piston, upper chamber, to the lower side of the piston, lower chamber. When the solenoid is actuated, the armature moves to block flow from the lower side of the piston to the upper side of the piston and the ball check valve in the second flow path only allows flow from the upper chamber to the lower chamber. Therefore when the solenoid is actuated, the actuator is prevented from retracting and can only extend.

By preventing the actuator from retracting the effective belt tension is increased, especially during a torque transient. Further if the solenoid is energized while the engine is rotating the engine compression/combustion torque pulsations, generate torque pulsations in the FEAD belt which generate a force pulsation on the active tensioner that cause the pressure across the actuator piston to oscillate. If the actuator piston solenoid is energized then fluid will flow from the upper side of the piston to the lower side, causing the actuator to extend, increasing the FEAD belt tension. There may be multiple conditions that can cause the active tensioner to degrade. For example, the tensioner may degrade due to the presence of debris in the oil from the manufacturing process or wear over time. As another example, the hydraulic oil seal may degrade which could lead to a loss of fluid and therefore a loss of actuation function. As another example, there may be an electrical issue in the solenoid. As yet another example, the solenoid return may fail to return to its original position. If the actuator degrades in the retracted state, then the actuator will behave like a passive damper. As the active tensioner is designed to allow the FEAD belt to operate at a lower tension when in the un-actuated state this could lead to excessive belt slip, especially during crank and torque boost events, which could lead to reduced FEAD belt life. If the actuator degrades in the actuated or extended state, the actuator will then operate with high FEAD belt tension under all conditions. The increased belt tension may lead to higher average side loads on the crankshaft pulley and can lead to increased engine friction, and thereby increased fuel consumption, as well as increased engine and FEAD belt wear.

During selected conditions, such as when the engine is in a steady-state and the BISG torque is at or around zero torque (e.g. after a key start while the transmission is in park or while in engine idle mode prior to engine shutdown), the tensioner may be actively actuated to the extended state and one or more engine torque parameters may be monitored over a duration for an increase in engine load. If an increase in engine load is not observed, degradation of the active tensioner may be indicated, and the tensioner may be timely serviced.

It will be appreciated that while FIG. 4 describes an active tensioner with two flow orifices located in a fixed position, in an alternate example, the active tensioner may also be designed with the two orifices mounted on a moving piston. In this design, the tensioner includes a first flow orifice, equipped with a one-way check valve, which only allows oil to flow from lower to upper chamber, and a second flow orifice, equipped with a one-way check valve and a solenoid, which only allows oil to flow from upper to lower chamber when the solenoid is deactivated, and restricts oil flow from the upper to lower chamber when the solenoid is energized. In this way, when the solenoid is actuated, the tensioner may be maintained at an extended state since the flow path from the upper to lower chamber is blocked. It is important to note that since this design requires the valves (of the orifice) to be mounted within the moving piston, it will make the wiring more difficult, which may negatively impact its durability and manufacturing complexity.

FIGS. 3 and 4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 5:
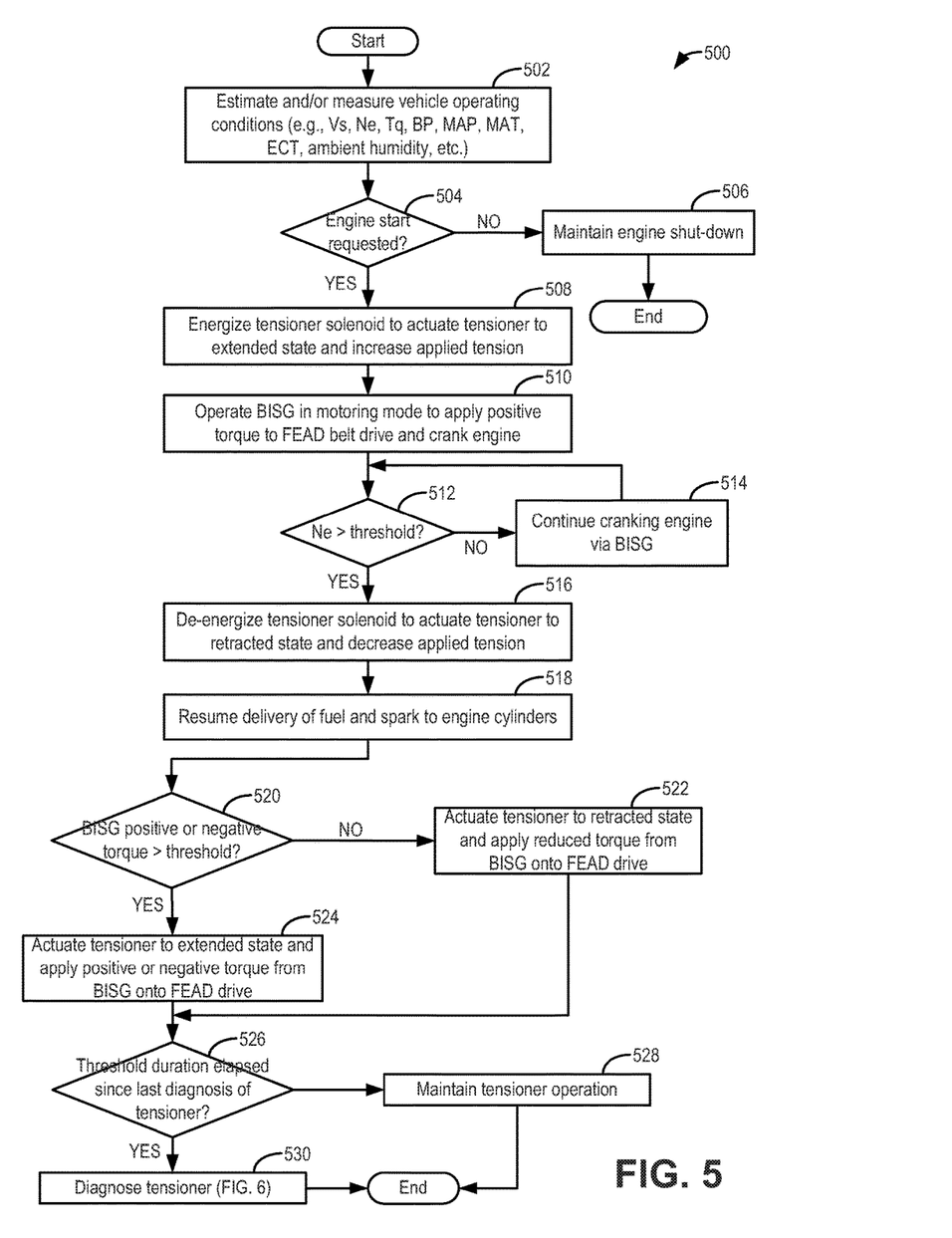
FIG. 5 is a flow chart depicting an example method for adjusting tension in a FEAD drive via an active BISG tensioner.

Referring now to FIG. 5, an example routine 500 performed by a controller to energize a solenoid of the active tensioner during selected conditions, such as during engine cranking, to increase the tension applied on the belt drive, thereby increasing engine load. Instructions for carrying out method 500 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 502, engine operating conditions may be estimated and/or inferred. These may include, for example, engine speed, driver torque demand, ambient conditions (e.g. ambient temperature and humidity, and barometric pressure), MAP, MAF, MAT, engine temperature, boost level, etc.

Based on the estimated operating conditions, at 504, it may be determined if an engine start is requested. An engine start may be requested by a vehicle operator responsive to an operator key-on event (such as when the driver inserts a key into an ignition slot or engages a start button). In some examples, an engine controller may automatically request an engine start from an idle-stop condition such as in response to a low battery state of charge or a request for air conditioning. If an engine start is not confirmed, the method proceeds to 506 to maintain the engine shut-down. The routine then exits.

Upon confirmation of an engine start condition, at 508, the method includes energizing a solenoid of an active tensioner coupled to a drive belt to actuate the tensioner to an extended state. The active tensioner may be coupled, via an idler pulley, to a region of am FEAD drive belt between a crankshaft pulley (coupled to an engine crankshaft) and a BISG pulley (coupled to a BISG). By energizing the solenoid to actuate the active tensioner to an extended state, a tension applied to the FEAD belt by the BISG is increased. At 510, the method further includes operating the BISG in a motoring mode in order to apply positive torque to the FEAD belt drive, thereby cranking the engine. For example, the controller may send a duty cycle signal to a motor of the BISG to spin the BISG using electrical energy drawn from a system battery, the BISG torque conveyed to the engine crankshaft via the drive belt (and the BISG and crankshaft pulleys). In one example, the BISG motor is operated at 100% duty cycle to expedite cranking of the engine.

At 512, it may be determined if the engine speed (Ne) is higher than a threshold. For example, it may be determined if the engine speed provided by the positive torque of the BISG is above a pre-determined threshold, such as above 400 rpm. Above the threshold speed, the engine may be able to sustain engine rotation via cylinder fuel combustion. If the threshold engine speed has not been attained, at 514, the routine continues cranking the engine using motoring torque drawn from the BISG until the engine speed is above the pre-determined threshold. In addition, the active tensioner is maintained in the extended state.

Once the engine speed cross the threshold, the method may proceed to 516. At 516, the method includes de-energizing the tensioner so that the tensioner goes back to its retracted state, decreasing the tension applied by the tensioner on the FEAD belt in a region between the crankshaft pulley and the BISG pulley. For example, the controller may discontinue sending an electrical signal to the solenoid. At 518, the method includes resuming delivery of fuel and spark to the engine cylinders so that cylinder fuel combustion can be used to keep the engine spinning.

After being used to crank the engine, the BISG may be operated in a power-assist mode or a generator mode depending on the operating conditions of the engine. In the power assist mode, the operator torque demand may be higher than the engine torque that can be provided. Thus, during those conditions, positive torque may be applied from the BISG to assist the engine torque in meeting the torque demand. At this time, the BISG torque is added to the engine torque. In one example, after the vehicle starting operation has been completed, the BISG may operate in the power-assist mode and generate a positive torque when the vehicle is accelerating due to a larger tip-in or when the vehicle is going uphill. In the generator mode, the engine torque exceeds the operator torque demand. Alternatively, the BISG may be operated in the generating mode when a state of charge of a system battery is lower than a threshold. During those conditions, negative torque may be applied from the BISG to use engine torque to charge the battery. Therein the engine may be spinning the BISG motor. The BISG may operate in the generator mode to supply electrical power to an electric energy storage device and generate a negative torque when the vehicle is going downhill or decelerating (e.g., during regenerative braking).

At 520, it may be determined if the absolute BISG torque, that is positive or negative torque, is higher than threshold. In one example, the threshold is based on the maximum desired torque assist. If the BISG positive or negative torque is below the threshold, then the method proceeds to 522 where the active tensioner is actuated to the retracted state and reduced torque is applied from the BISG onto FEAD belt drive. For example, the solenoid of the active tensioner is de-energized (if it was energized) to move the tensioner to the retracted state. If the BISG torque is above the threshold, at 524, the solenoid is energized to actuate the tensioner to its extended state and, depending on the operation mode of the BISG, a positive or negative torque is applied from the BISG onto the FEAD belt drive.

At 526, it may be determined if a threshold duration of engine or vehicle operation (or distance of vehicle travel) has elapsed since a last diagnosis of the tensioner. The tensioner may be intermittently diagnosed to ensure functionality and improve component life and thereby engine performance. If the threshold duration has not elapsed, at 528, tensioner operation is maintained and the routine may end. For example, the tensioner may continue to be actuated to an extended state when the BISG torque is higher, and actuated to the retracted state when the BISG torque is lower.

If the threshold duration has elapsed, then at 530, the method includes diagnosing the tensioner. As elaborated with reference to FIG. 6, diagnosing the active tensioner includes actuating the tensioner to an extended state during conditions when the BISG torque is at or around zero torque. Then, based on a change in engine load following the actuation, the tensioner may be diagnosed. In particular, absence of an increase in engine load following actuation of the tensioner to an extended state may indicate that the tensioner is degraded (e.g., stuck in the retracted state).

Figure 6:
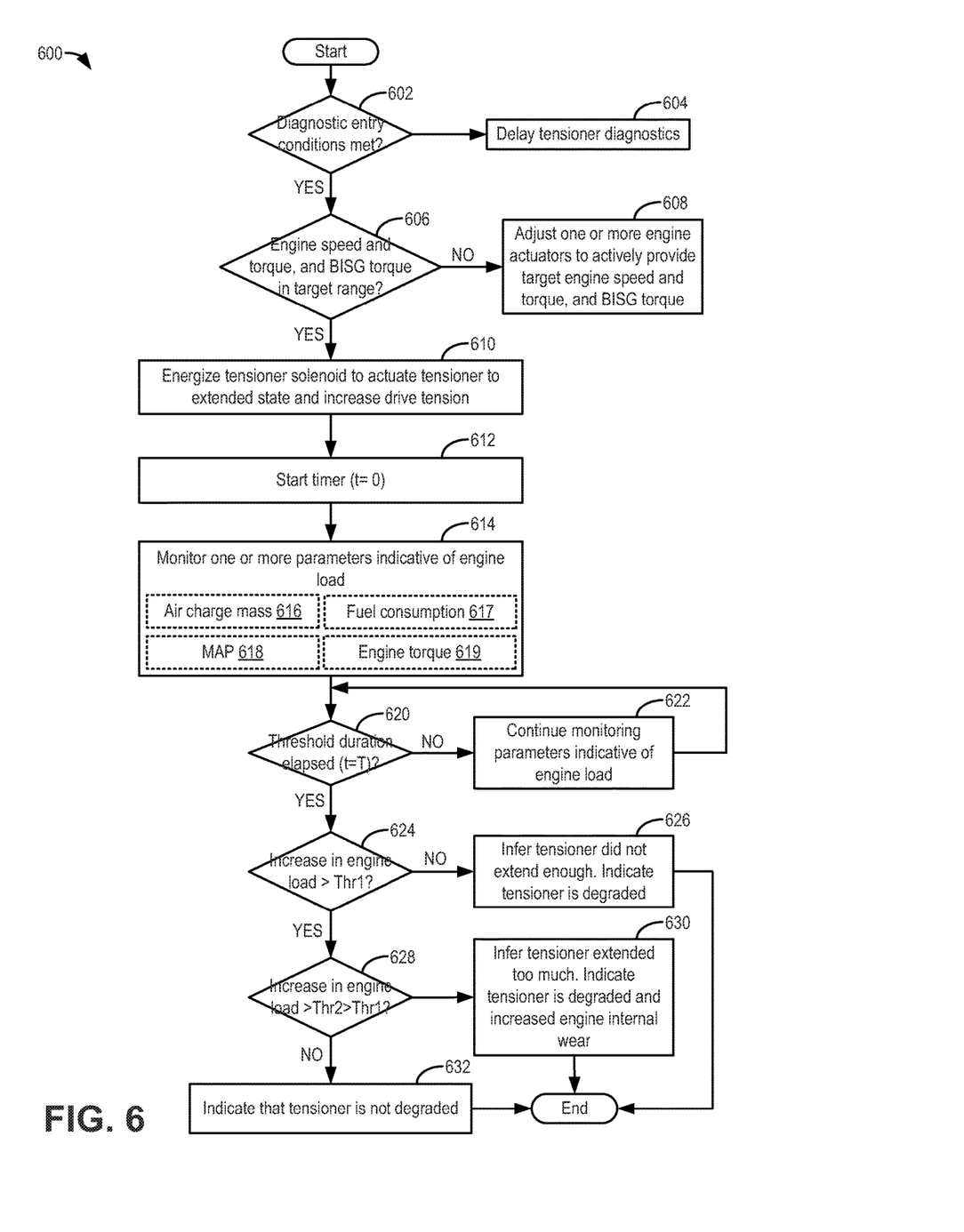
FIG. 6 is a flow chart depicting an example method for diagnosing an active BISG tensioner, according to the present disclosure.

Now turning to FIG. 6, an example method 600 for diagnosing an active tensioner of a belt driven FEAD system, based on a change in engine load, is shown. The method enables an active tensioner to be diagnosed and degradation to be timely identified and addressed.

At 602, it may be determined if conditions for initiating a diagnosis of the active tensioner are met. In one example, diagnostic conditions are considered met if a threshold duration has elapsed since a last diagnosis of the tensioner. As such, the diagnostic conditions assessed at 602 include entry conditions for the diagnostic routine (that are distinct from execution conditions of the diagnostic routine). If the conditions are met, then at 604, tensioner diagnostics are delayed. That is, the method of FIG. 6 is initiated again at a later time.

If entry conditions are met, then at 606, the method includes determining if execution conditions for the diagnostic routine are met. For example, it may be determined if the engine speed and torque, as well as the BISG torque, are within a target range. In one example, execution conditions may be considered met when the engine is in a steady-state. Alternatively, execution conditions may be considered met when the engine is in its lowest possible speed and torque region (e.g. when it is at a neutral idle state). In addition, it may be confirmed that the BISG torque is at or around zero torque which establishes the minimum FEAD belt tension condition baseline. That is, the routine is performed when the BISG is in neither a motoring nor generating mode. In one example, the diagnostic routine may be executed after a key start of the engine, while the transmission is in a park mode, or while the engine is in idle, or during an engine speed control mode prior to engine shut down. For example, the routine may be executed during an engine idle during a pre-shutdown mode of a stop/start event. Further still, the routine may be executed while the vehicle is in cruise control or in any constant engine speed region. If the engine or BISG conditions are not met, at 608, one or more engine actuators may be adjusted to actively provide the engine speed and torque required to execute the diagnostic routine and to maintain the BISG within the target torque range.

If execution conditions for the routine are met, at 610, the routine includes the controller sending a signal to energize the tensioner solenoid, thereby actuating the tensioner to the extended state, and increasing a tension applied on the belt drive. At 612, a timer may be started.

At 614, one or more parameters indicative of engine load may be monitored following the energization of the solenoid and actuation of the tensioner to the extended state. For example, one or more an intake air mass 616, an intake manifold air pressure 618, a rate of engine fuel consumption 617, and an engine torque output 619 may be monitored. Intake air mass 616 may be measured via a MAF sensor coupled to the intake passage. Intake manifold pressure may be measured via a MAP sensor coupled to the intake manifold. Engine fuel consumption may be determined based on a fuel injector pulse width commanded by the engine controller. Engine torque output may be inferred based on engine speed, as measured by a crankshaft speed sensor. Alternatively, a torque sensor coupled to the engine output shaft may be used to measured engine torque. Actuation of the tensioner to the extended state is expected to increase the tension applied to the drive belt, increasing the engine load. When the engine load increases, an engine controller may increase the opening of an intake throttle with a resultant increase air mass flow and manifold pressure. In addition, to maintain engine operation at a target air-fuel ratio, such as at stoichiometry, fuel consumption may be increased (as a function of the increase in air charge). As a result of the increase in engine air and fuel delivery, a torque output by the engine may increase. Thus the application of additional tension on the FEAD belt via the actuation of the tensioner (to the extended state) may be inferred based on an increase in engine load, as indicated by a measured change (increase) in air mass, air pressure, fuel consumption, and/or engine torque output At 620, it may be determined if the timer has exceeded a threshold time T. That is, it may be determined whether a threshold duration has elapsed since the tensioner was actuated to the extended state. The threshold time T may correspond to a duration of engine operation at presumably higher engine load required to reliably detect an increase in one or more parameters indicative of engine load (at 614).

If the threshold time T has not elapsed, then at 622, the routine may continue to monitor the parameters representative of engine until the threshold time T is reached. If the threshold duration has elapsed, then the routine may proceed to 624.

At 624, it may be determined if the engine load estimated based on the one or more parameters indicative of engine load is above a first threshold. In one example, the first threshold is based on the engine load at idle condition. If the estimated engine load is below the first threshold, then the method proceeds to 626 where it may be inferred that the tensioner did not fully extend. For example, it may be inferred that the tensioner is stuck in the retracted state and did not extend responsive to the energization of the solenoid. The controller may set a diagnostic code to indicate that the tensioner is degraded, for example, due to belt wear/stretch. In response to the indication of degradation, one or more mitigating steps may be performed. For example, in response to indication that the tensioner is stuck in the retracted state, engine shutdown may be inhibited and a torque boost amplitude may be limited. In addition, engine charging torque may be limited. For example, a power assist provided by the BISG to the engine, and start/stop operations may be limited. In addition, a message may be displayed to the vehicle owner to warn them that the engine may not restart after a shutdown is executed. Further, if the fault persists over multiple key drive cycles, it is desirable to provide a warning to the operator to inform the operator to seek service.

If the engine load increased above the first threshold, at 628, it may be determined if the estimated engine load is below a second threshold, higher than the first threshold. In one example, the second threshold is based on the estimated engine torque used to detect whether the actuator is actuating as commanded. When the actuator is in the active state, then it will extend which will increase the tension in the FEAD belt which will in turn increase the load on the engine. This increase in the load on the engine can then be detected by comparing the engine estimated engine load before and after actuation. If the estimate load is within the expected range (that is, between the first and second thresholds), at 632, it may be inferred that the tensioner did function correctly and did apply an increased tension to the belt drive upon actuation to the extended state. The controller may indicate that the tensioner is not degraded.

If the estimated engine load is higher than both the first threshold and the second threshold, at 630, it may be inferred that the tensioner extended too much (e.g., tensioner was stuck in the extended state) and that belt slip and increased engine internal wear may occur due to excessive belt tension. The controller may set a diagnostic code to indicate that the tensioner is degraded. In response to the indication of degradation, one or more mitigating steps may be performed. For example, in response to indication that the tensioner is stuck in the extended state, boosted engine torque may be limited. This is done to reduce the rate of FEAD belt wear and to reduce wear of internal engine bearings. It will be appreciated that while the example of FIG. 6 describes diagnosing the tensioner based on a change in engine load following actuation of the tensioner to an extended state, in alternate examples, the tensioner may be diagnosed based on a change in engine load following actuation of the tensioner to a retracted state. By detecting a reduction in torque, the system is confirming that the tensioner is not generating excessive tension.

Figure 7:
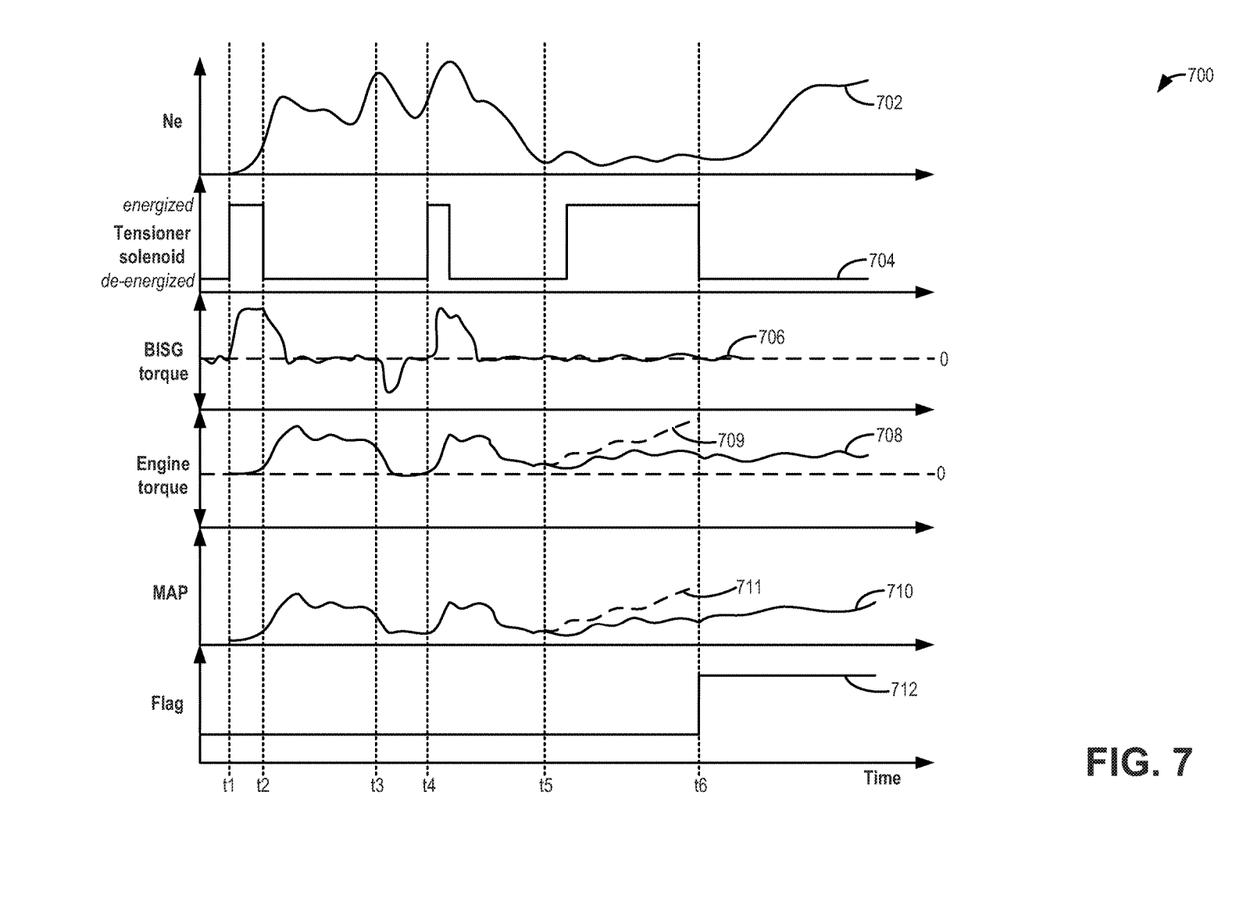
FIG. 7 shows example changes to an engine load via adjustments to an active BISG tensioner, and diagnosis of the tensioner based on the change in engine load.

FIG. 7 shows a prophetic example of belt tensioner diagnostics at map 700. Engine speed is shown at plot 702, active tensioner solenoid state (energized or de-energized) is shown at plot 704, BISG torque (positive or negative) is shown at plot 706, engine torque is shown at plot 708, manifold pressure (MAP) is shown at plot 710, and the status of a flag (indicative of a state of degradation of the tensioner) is shown at plot 712. All plots are shown over time along the x-axis.

Prior to t1, the engine is shutdown and the vehicle is not propelled. At t1, responsive to key-on event, an engine restart signal is received. To restart the engine, the BISG is motored generating positive BISG torque. The BISG torque is used to crank the engine by transmitting the torque via an FEAD drive belt. To enable the BISG torque to be transmitted to the engine without belt slip occurring, the tensioner solenoid is energized and the tensioner is transitioned to an extended state.

Between t1 and t2, the tensioner is extended and BISG torque is used to spin up the engine. At t2, the engine speed is higher than a threshold where engine combustion can sustain engine rotation. Thus at t2, the BISG tensioner is de-energized and returned to a retracted state. Responsive to engine rotation, engine speed and manifold pressure starts to increase.

Between t2 and t3, the vehicle is propelled using engine torque and BISG torque is at or around zero torque since BISG operation is not required. At t3, there is a deceleration event and engine torque exceeds demanded torque. To expedite engine spin-down, a negative BISG torque is applied. Specifically, the BISG is operated as a generator absorbing the excess engine torque. To enable the engine torque to be transmitted to the BISG without belt slip occurring, the tensioner solenoid is energized and the tensioner is transitioned to an extended state. Once the engine speed has been reduced to an idle speed, and the engine torque is reduced to zero torque, the tensioner solenoid is de-energized and returned to a retracted state. Thereafter, engine torque output increases to match torque demand.

At t4, there is an increase in torque demand, such as due to an operator pedal tip-in. The engine torque output is not sufficient to meet the torque demand. To provide a power assist, positive BISG torque is used to supplement the engine torque supplied to the vehicle wheels. To enable the BISG torque to be transmitted without belt slip occurring, the tensioner solenoid is energized and the tensioner is transitioned to an extended state. Then, when power assist is not required, the tensioner solenoid is de-energized and returned to a retracted state.

Shortly before t5, the engine is in a neutral idle state and BISG torque is around zero torque. Accordingly, at t5, entry and execution conditions for tensioner diagnosis is confirmed. The tensioner solenoid is energized and the tensioner is transitioned to an extended state. In the extended state, the load applied by the BISG on the engine increases. As a result, engine speed and engine load are expected to increase. Herein MAP is monitored for a duration (from shortly after t5 to t6) following the energization of the solenoid and MAP is used to infer engine load.

In the depicted example, no significant increase in engine load or torque is observed. The expected engine torque profile for the duration of tensioner actuation is shown at dashed segment 709 and the expected engine load profile reflected by the expected MAP profile for the duration of tensioner actuation is shown at dashed segment 711.

In response to the lower than threshold increase in engine load (estimated based on measured MAP) while the tensioner is actuated to the extended state, at t6, it in inferred that the tensioner is stuck in the retracted state and is not applying the commanded tension on the belt. Therefore at t6, degradation of the tensioner is indicated by setting a flag. In addition, an engine shutdown is temporarily inhibited.

In this way, by accurately and reliably diagnosing an active belt tensioner, belt slip may be better predicted and addressed in a timely manner. The technical effect of diagnosing a belt tensioner based on a change in engine load following actuation of the tensioner to an extended state is that the presence or absence of an increase in engine load may be correlated with the state of the tensioner. By using one or more parameters indicative of engine load to diagnose the tensioner, the diagnosis may be performed using existing engine sensors, and with the need for additional components. By diagnosing the tensioner based on a commanded state relative to an actual state, inferred based on engine load, tensioner degradation causing excess belt tension may be better distinguished from tensioner degradation causing insufficient belt tension. As a result, the incidence of belt slip may be reduced, extending the life and health of the belt tensioner. By diagnosing the tensioner in a timely manner, engine performance may be improved.

One example method for an engine comprises: adjusting an operating state of a belt tensioner coupled to a drive belt; and indicating tensioner degradation in response to engine load being less than a threshold after the adjusting. In the preceding examples, the method additionally or optionally further comprises inhibiting automatic engine shutdown responsive to the indication of degradation. In any or all of the preceding examples, the method additionally or optionally further comprises shutting down an engine responsive to an operator request to shutdown the engine or responsive to the operator exiting the vehicle. In any or all of the preceding examples, the method additionally or optionally further comprises adjusting the operating state of the tensioner includes, actuating the tensioner from a retracted state to an extended state. In any or all of the preceding examples, additionally or optionally, the engine load is inferred based on one or more of a measured manifold air flow, a measured manifold pressure, and engine torque. In any or all of the preceding examples, additionally or optionally, the adjusting includes adjusting the operating state of the belt tensioner while an absolute amount of positive or negative torque applied by a belt integrated starter generator on the drive belt is less than a threshold. In any or all of the preceding examples, additionally or optionally, the adjusting includes adjusting while the engine is idling with a transmission actuated to a neutral gear. In any or all of the preceding examples, additionally or optionally, the tensioner is coupled to a first region of the drive belt in between an engine crankshaft and a starter/motor. In any or all of the preceding examples, the method additionally or optionally further comprises indicating degradation includes indicating that the tensioner is stuck in the retracted state. In any or all of the preceding examples, the method additionally or optionally further comprises wherein in the extended state, a tension applied by the tensioner on the drive belt is increased. In any or all of the preceding examples, the method additionally or optionally further comprises applying tension to a second region of the drive belt between the starter/motor and an accessory load, the accessory load including an air conditioner, the accessory load coupled to the drive belt via an AC clutch pulley.

Another example method for an engine comprises: while torque applied by a BISG on a drive belt is lower than a threshold, energizing a solenoid to actuate a tensioner coupled to the drive belt to an extended state; and indicating degradation of the tensioner based on a change in engine load responsive to and concurrent with the energizing. In any or all of the preceding examples, additionally or optionally, the torque is a positive torque applied by the BISG on the drive belt to crank the engine or provide a power assist to the engine. In any or all of the preceding examples, additionally or optionally, the torque is a negative torque applied by the BISG on the drive belt to charge a battery coupled to the BISG. In any or all of the preceding examples, the method additionally or optionally further comprises responsive to the indicating, disabling automatic shutdown of the engine independent of operator input; and shutting down the engine responsive to explicit operator input. In any or all of the preceding examples, additionally or optionally, the indicating includes indicating degradation based on the change in engine load including a less than threshold increase in engine load.

Another example vehicle system comprises: a front end accessory drive including a belt; an engine coupled to the belt via a crankshaft pulley; a BISG coupled to the belt via a BISG pulley, the BISG coupled to a battery; an accessory load coupled to the belt via a clutch pulley; an electrically actuatable tensioner coupled to the belt between the crankshaft pulley and the BISG pulley, the tensioner having a solenoid coupled to a spring mechanism; and a controller with computer readable instructions stored on non-transitory memory for: when BISG torque is at zero torque and the engine is idling; commanding the tensioner to an extended state by energizing the solenoid; inferring an actual state of the tensioner based on a change in engine load following the energizing; and indicating degradation of the tensioner based on the commanded state relative to the actual state. In the preceding example, additionally or optionally, the inferring includes inferring that the actual state of the tensioner is a retracted state when the change in engine load is less than a threshold, and wherein the indicating includes indicating that the tensioner is degraded when the commanded state does not match the actual state. In any or all of the preceding examples, additionally or optionally, the controller includes further instructions for: not shutting down the engine responsive to higher than threshold state of charge of the battery or a drop in operator torque demand; and shutting down the engine responsive to an operator shutdown request or an operator exit from the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A vehicle drive system, comprising:
a front end accessory drive including a belt;
an engine coupled to the belt via a crankshaft pulley;
a BISG coupled to the belt via a BISG pulley, the BISG coupled to a battery;
an accessory load coupled to the belt via a clutch pulley;
an electrically actuatable tensioner coupled to the belt between the crankshaft pulley and the BISG pulley, the tensioner having a solenoid coupled to a spring mechanism; and
a controller with computer readable instructions stored on non-transitory memory for:
when BISG torque is at zero torque and the engine is idling;
commanding the tensioner to an extended state by energizing the solenoid;
inferring an actual state of the tensioner based on a change in engine load following the energizing; and
indicating degradation of the tensioner based on the commanded state relative to the actual state.

2. The system of claim 1, wherein inferring includes inferring that the actual state of the tensioner is a retracted state when the change in engine load is less then a threshold, and wherein the indicating includes indicating that the tensioner is degraded when the commanded state does not match the actual state.

3. The system of claim 1, wherein the controller includes further instructions for:
not shutting down the engine responsive to higher than threshold state of charge of the battery or a drop in operator torque demand; and
shutting down the engine responsive to an operator shutdown request or an operator exit from the vehicle.

4. A method for an engine of a vehicle, comprising:
adjusting an operating state of a belt tensioner coupled to a drive belt; and
indicating tensioner degradation in response to engine load being less than a threshold after the adjusting.

5. The method of claim 4, further comprising inhibiting automatic engine shutdown responsive to the indication of degradation.

6. The method of claim 5, further comprising, shutting down an engine responsive to an operator request to shutdown the engine or responsive to the operator exiting the vehicle.

7. The method of claim 4, wherein adjusting the operating state of the tensioner includes, actuating the tensioner from a retracted state to an extended state.

8. The method of claim 7, wherein the belt tensioner is an electrohydraulic belt tensioner and wherein adjusting the operating state includes energizing a solenoid of the tensioner to actuate the tensioner to the extended state.

9. The method of claim 4, wherein the engine load is inferred based on one or more of a measured manifold air flow, a measured manifold pressure, and engine torque.

10. The method of claim 4, wherein the adjusting includes adjusting the operating state of the belt tensioner while an absolute amount of positive or negative torque applied by a belt integrated starter generator on the drive belt is less than a threshold.

11. The method of claim 4, wherein the adjusting includes adjusting while the engine is idling with a transmission actuated to a neutral gear.

12. The method of claim 4, wherein the tensioner is coupled to a first region of the drive belt in between an engine crankshaft and a starter/motor.

13. The method of claim 12, further comprising, applying tension to a second region of the drive belt between the starter/motor and an accessory load, the accessory load including an air conditioner, the accessory load coupled to the drive belt via an AC clutch pulley.

14. The method of claim 4, wherein indicating degradation includes indicating that the tensioner is stuck in the retracted state.

15. The method of claim 4, wherein in the extended state, a tension applied by the tensioner on the drive belt is increased.

16. A method for an engine of a vehicle, comprising:
while torque applied by a BISG on a drive belt is lower than a threshold,
energizing a solenoid to actuate a tensioner coupled to the drive belt to an extended state; and
indicating degradation of the tensioner based on a change in engine load responsive to and concurrent with the energizing.

17. The method of claim 16, wherein the torque is a positive torque applied by the BISG on the drive belt to crank the engine or provide a power assist to the engine.

18. The method of claim 16, wherein the torque is a negative torque applied by the BISG on the drive belt to charge a battery coupled to the BISG.

19. The method of claim 16, further comprising:
responsive to the indicating, disabling automatic shutdown of the engine independent of operator input; and
shutting down the engine responsive to explicit operator input.

20. The method of claim 16, wherein the indicating includes indicating degradation based on the change in engine load including a less than threshold increase in engine load.

* * * * *